(12) United States Patent
Lee

(10) Patent No.: US 7,538,544 B2
(45) Date of Patent: May 26, 2009

(54) INDUCTIVE POSITION SENSOR

(75) Inventor: Joong K. Lee, Chatham (CA)

(73) Assignee: KSR Technologies Co., Ridgetown (CA)

( * ) Notice: Subject to any disclaimer, the term of this patent is extended or adjusted under 35 U.S.C. 154(b) by 0 days.

(21) Appl. No.: 11/852,454

(22) Filed: Sep. 10, 2007

(65) Prior Publication Data

US 2008/0054887 A1    Mar. 6, 2008

Related U.S. Application Data

(63) Continuation of application No. 11/102,045, filed on Apr. 8, 2005, now Pat. No. 7,276,897.

(60) Provisional application No. 60/598,192, filed on Aug. 2, 2004, provisional application No. 60/561,065, filed on Apr. 9, 2004.

(51) Int. Cl.
    *G01B 7/30* (2006.01)
    *G01B 7/00* (2006.01)
(52) U.S. Cl. ............... 324/207.25; 324/207.17
(58) Field of Classification Search ............... 324/207.15–207.17, 207.24–207.25, 256–258; 73/514.31, 514.39; 33/706, 708; 336/30, 336/45
    See application file for complete search history.

(56) References Cited

U.S. PATENT DOCUMENTS

| | | | |
|---|---|---|---|
| 3,777,273 A | 12/1973 | Baba et al. |
| 4,233,300 A | 11/1980 | Denzel et al. |
| 4,638,250 A | 1/1987 | Shen-Orr et al. |
| 4,737,698 A | 4/1988 | McMullin et al. |
| 5,003,260 A | 3/1991 | Auchterlonie |
| 5,036,275 A | 7/1991 | Munch et al. |
| 5,233,294 A | 8/1993 | Dreoni et al. |
| 5,291,782 A | 3/1994 | Taylor |
| 5,563,922 A | 10/1996 | Beltz |
| 6,011,389 A | 1/2000 | Masreliez et al. |
| 6,018,318 A | 1/2000 | Schodlbauer |

(Continued)

FOREIGN PATENT DOCUMENTS

GB            1502697            3/1978

OTHER PUBLICATIONS

J. Szczyrbak and E.D.D. Schmidt. "LVDT Signal Conditioning Techniques." Measurements and Control, Jun. 1997.

(Continued)

*Primary Examiner*—Bot LeDynh
(74) *Attorney, Agent, or Firm*—Gifford, Krass, Sprinkle, Anderson & Citkowski, P.C.

(57) ABSTRACT

An inductive position sensor for position sensing includes a transmitter coil and a receiver coil, the receiver coil generating a receiver signal when the transmitter coil is excited by an alternating current source. A moveable coupler element modifies the inductive coupling between the transmitter coil and the receiver coil so that the receiver signal is sensitive to the coupler element position. For example, the coupler element may rotate about a common central axis of the transmitter coil and receiving coil. In further examples, a reference coil is configured so that a provided reference signal is substantially insensitive to variations in the angular position of the coupler element. A ratio between the receiver signal and the reference signal is sensitive to the coupler element position, but substantially insensitive to common mode factors that influence the reference signal and receiver signal to a substantially equal degree.

18 Claims, 8 Drawing Sheets

U.S. PATENT DOCUMENTS

| | | |
|---|---|---|
| 6,166,535 A | 12/2000 | Irle et al. |
| 6,236,199 B1 | 5/2001 | Irle et al. |
| 6,255,810 B1 | 7/2001 | Irle et al. |
| 6,304,076 B1 | 10/2001 | Madni |
| 6,329,813 B1 | 12/2001 | Andermo |
| 6,366,078 B1 | 4/2002 | Irle et al. |
| 6,369,564 B1 | 4/2002 | Khalfin et al. |
| 6,384,597 B1 | 5/2002 | Irle et al. |
| 6,384,598 B1 | 5/2002 | Hobein et al. |
| 6,400,139 B1 | 6/2002 | Khalfin et al. |
| 6,412,364 B1 | 7/2002 | Berglar |
| 6,443,020 B1 | 9/2002 | Lin et al. |
| 6,448,759 B2 | 9/2002 | Madni et al. |
| 6,467,338 B1 | 10/2002 | Irle et al. |
| 6,483,295 B2 | 11/2002 | Irle et al. |
| 6,520,031 B2 | 2/2003 | Madni et al. |
| 6,522,128 B1 | 2/2003 | Ely et al. |
| 6,541,960 B2 | 4/2003 | Nekado |
| 6,549,004 B1 | 4/2003 | Prigge |
| 6,584,428 B1 | 6/2003 | Irle et al. |
| 6,593,730 B2 | 7/2003 | Zapf et al. |
| 6,615,155 B2 | 9/2003 | Gilboa |
| 6,642,711 B2 | 11/2003 | Kawate et al. |
| 2002/0040531 A1 | 4/2002 | Schodlbauer |
| 2002/0097042 A1 | 7/2002 | Kawate et al. |
| 2003/0137294 A1 | 7/2003 | Gleixner et al. |
| 2005/0030010 A1 | 2/2005 | Jones et al. |

OTHER PUBLICATIONS

"AD598 LVDT Signal Conditioner Specifications Sheet." Analog Devices, Norwood, MA. (believe to have been offered for sale, publicly used, and/or published prior to the filing date of this application), Jan. 14, 2009.

INDUCTIVE POSITION SENSOR

CROSS REFERENCE TO RELATED APPLICATIONS

This application is a continuation of U.S. patent application Ser. No. 11/102,045 filed Apr. 8, 2005, now U.S. Pat. No. 7,267,897 B2, which claims priority of U.S. Provisional Patent Applications Ser. No. 60/561,065 filed Apr. 9, 2004 and Ser. No. 60/598,192 filed Aug. 2, 2004, the entire contents of which are incorporated herein by reference.

FIELD OF THE INVENTION

This invention relates to a non-contacting inductive sensor for measuring the position of a movable part such as a pivoting throttle pedal.

BACKGROUND OF THE INVENTION

Motorized vehicles, such as automobiles, are provided with a user-operated control that controls engine speed. Typically, the user-operated control comprises a pedal arm having a foot pedal at a lower end of the pedal arm, typically referred to as an accelerator pedal, or throttle pedal. The pedal assembly provides a throttle control signal that is transmitted to an engine throttle control associated with the engine. Conventionally, there is a mechanical connection between accelerator pedal and the engine throttle control, and the throttle control signal is a mechanical signal. However, there has been a recent trend towards electronically controlled throttle control systems, sometimes termed fly-by-wire systems, in which the accelerator pedal or other user operated control is in electrical communication with the engine throttle control, the throttle control signal being an electronic signal. For commercial acceptability, such electronic throttle control systems should be reliable and not excessively expensive to manufacture. Hence, there is a need for improved inductive position sensors for engine control applications. Similarly, there are many other position sensing applications that would benefit from improved inductive position sensors.

SUMMARY OF THE INVENTION

An apparatus for determining a part position of a movable part comprises a transmitter coil, the transmitter coil generating electromagnetic radiation when the transmitter coil is excited by a source of electrical energy, a receiver coil disposed proximate to the transmitter coil, the receiver coil generating a receiver signal when the transmitter coil is excited due to an inductive coupling between the receiver coil and the transmitter coil, and a coupler element. The coupler element is moveable and has a coupler element position correlated with the part position, for example by mechanical attachment or other mechanical coupling. The coupler element modifies the inductive coupling between the transmitter coil and the receiver coil so that the receiver signal is correlated with the part position, and may be a metal plate, conducting loop, or comprise a plurality of conducting loops.

In representative examples, the receiver coil includes a first loop configuration and a second loop configuration, the first loop configuration and second loop configuration having opposite winding directions when viewed from the same direction. The inductive coupling between the transmitter coil and the first loop configuration generates a first signal, the inductive coupling between the transmitter coil and the second loop configuration generates a second signal, the receiver signal being a combination of the first signal and the second signal, such as a sum of opposed first and second voltages.

The transmitter coil may be a loop having one or more turns. In other examples may includes a first loop configuration and a second loop configuration, the first loop configuration and second loop configuration having opposite winding directions so that the transmitted electromagnetic flux has a spatial variation of magnetic field direction, including regions of opposed magnetic field direction. A coupler element can then be used to modify the ratio of opposed signals that would tend to be induced in a receiver coil.

Rotation or linear motion of the coupler element can be used to modify the inductive coupling between the transmitter coil and the receiver coil, for example by modifying a ratio of a first voltage to a second voltage within a receiver coil having first and second portions wound in opposite senses (e.g. clockwise and anticlockwise). Coupler element position may be correlated with a pedal position, for example pedal movement being mechanically coupled to the angular position of the coupler element.

In other examples of the present invention, an inductive sensor includes a reference coil, the reference coil generating a reference signal when the transmitter coil is excited due to a second inductive coupling between the transmitter coil and the reference coil that is substantially independent of the coupler element position. The reference signal can be used to compensate any variations in the receiver signal that are not due to coupler element position changes, for example due to common mode factors such as temperature, excitation voltage of the transmitter, and changes in relative coil and coupler separations. Electronic circuitry can be provided to form a ratio signal, the ratio signal being a ratio of the reference signal and the receiver signal, the ratio signal being used to determine a part position.

DETAILED DESCRIPTION OF THE INVENTION

Figure 1:
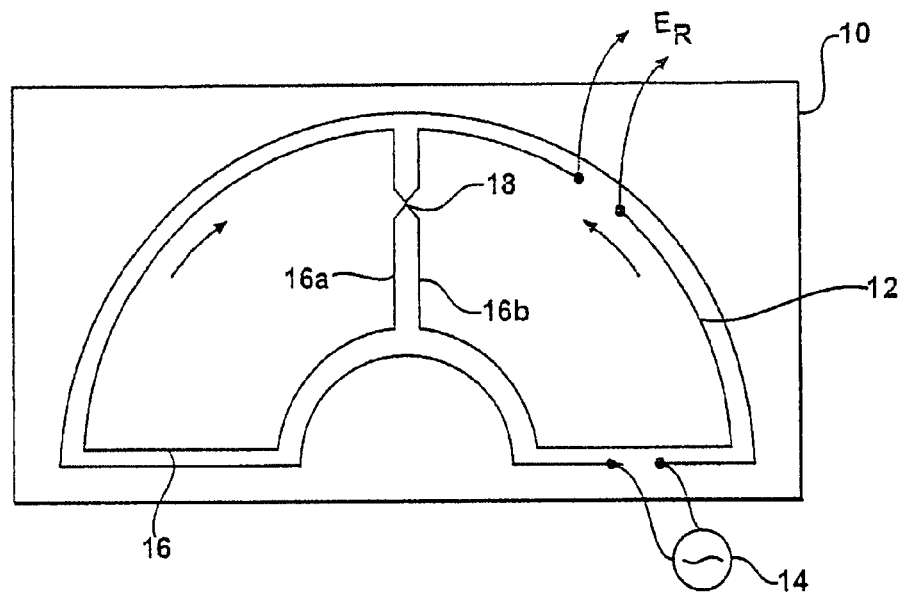
FIG. 1 is a schematic diagram of the windings of the exciter or transmitter coil and the receiver coil, both formed on a printed circuit board, used in connection with the present invention.

Examples of the present invention include an inductive position sensor which can be adapted for use in a throttle pedal position detector in an automotive vehicle, or position of other movable objects. In representative examples, the sensor includes a transmitter coil and a receiver coil, both formed by printed circuit techniques on printed circuit board. Inductive coupling between the transmitter coil and receiver coil induces a receiver signal in the receiver coil when the transmitter coil is excited, for example by an alternating current source. A coupler element, attached to the movable object, spatially modifies the inductive coupling between the transmitter coil and the receiver coil, allowing the receiver signal to be used to find the position of the movable object.

Inductive position sensors are described that employ a transmitter coil (sometimes called an exciter coil) powered by an AC source, a receiver coil (or pickup coil) for generating an induced signal in response to the time varying magnetic field generated by the transmitter coil, and an electrically conductive element positioned proximate to the coils such that the time varying magnetic field generates eddy currents in the coupler element which modify the currents induced in the receiver as a function of the position of the coupler element.

The coupler element is connected to a movable part whose position is to be measured, such as the throttle pedal of an automotive vehicle, such that the angular (or rotational) position of the couplet is a function of the position of the throttle element. Thus, the voltage induced in the receiver or pickup coil is varied; by detecting the received voltage, the position of the coupler element, and thus the throttle pedal may be determined. This signal may be used to control the speed of the vehicle engine.

Examples of the present invention include receiver coils having portions wound in opposed senses, for example a first portion of the receiver coil is wound in an anti-clockwise direction, and a second portion wound in a clockwise direction, the two portions preferably having different spatial extents (i.e. not completely overlapping). The term first loop configuration and second loop configuration will be used for such portions. The receiver signal from such a receiver coil is sensitive not only to the magnitude of the flux coupling between the receiver coil and the transmitter coil, but also to the spatial distribution of flux lines originating from the transmitter coil and passing through the receiver coil.

General Sensor Examples

An example inductive position sensor comprises a transmitter coil connected to an exciting alternating current source, and a receiver coil. The transmitter coil and receiver coil are supported on the same printed circuit board, either essentially co-planar, or on different layers of the same board. A moveable coupler element is supported proximate to the board, and modifies the inductive coupling between the transmitter coil and the receiver coil. In one example, the coupler element rotates about a rotation axis, which may be a central axis of one or both of the transmitter coil and receiving coil. The coupler element position modifies the amplitude of the receiver signal induced by the transmitter coil by modifying the inductive coupling between the transmitter coil and the receiver coil.

In the example sensor described above, the amplitude of the receiver signal is also a function of the gap between the coupler element and the printed circuit board, which inherently varies to a certain degree in a production situation. To correct the receiver signal for the variations resulting from the gap as well as other common mode signals such as variation of exciter or supply voltage, EMC, and temperature variation, a reference coil can also be used, for example formed on the same printed circuit board as the transmitter coil and the receiver coil. The reference coil receives the same signals as the receiver coil, but is configured in such a way that the reference signal is insensitive to variations in the rotary position of the coupler element. A signal conditioning circuit receives the receiver signal and the reference signal and forms a ratio signal, representative of the ratio of the receiver signal and the reference signal. The ratio signal is correlated with coupler element position, but can be substantially independent of gap variation and the other common mode factors, within reasonable variations, as discussed further below.

A printed circuit board can be configured having an input for electrical energy, and outputs providing the receiver signal and the reference signal. Alternatively, electrical circuitry on the board may be used to generate a ratio signal, as the ratio of the receiver signal and the reference signal. Signal processing circuitry can be used to divide the receiver signal by the reference signal to substantially eliminate signal variations which are not a function of the coupler position.

An inductive sensor according to an example of the present invention comprises a transmitter coil (which may also be referred to as an exciter coil) connected to an alternating current source such as a Colpitts oscillator, a receiver coil, and a coupler element supported in physical relationship to the transmitter coil and the receiver coil so that the position of the coupler element affects the strength of the inductive coupling between the transmitter coil and the receiving coil. A receiver signal provided by the receiver coil can be correlated with the position of the coupler element.

Transmitter Coil

The transmitter coil can be one or more loops in a conventional circular coil design, or other configurations can be used. The transmitter coil, which may also be referred to as an exciter coil, is excited by a source of alternating current. The exciting source or alternating current may be an electronic oscillator, such as a Colpitts oscillator, or other electronic oscillator.

When excited by electrical energy, the transmitter coil radiates electromagnetic radiation. There is inductive coupling between the transmitter coil and any other proximate coils, which induces a signal in that coil.

The transmitter coil may be a circular coil having one or more turns. An excitation signal is provided to the transmitter coil by an alternating current source. Inductive coupling between the transmitter coil and the receiver coil generates a receiver signal in the receiver coil.

Coupler Element

A coupler element modifies the inductive coupling between the transmitter coil and the receiver coil. In examples of the present invention, the coupler element need not be located between the transmitter coil and receiver coil, though it could be if that was a convenient configuration. Further, in examples of the present invention, the coupler element need not modify the total flux coupling between the transmitter coil and the receiver coil, but may only modify the spatial distribution of the flux coupling. A coupler element, if a conducting plate, may also be referred to as an eddy plate.

A coupler element can be an electrically conducting element which is generally planar in shape and which may comprise one or more radially extending lobes, and can be supported for rotation about the center line of the transmitting and receiving coils with its lobe or lobes parallel to and closely spaced from the printed circuit board. The configuration of lobes may depend largely on the configuration of the receiver coil.

The coupler element is attached to, or otherwise mechanically coupled to a movable object, so that its rotational position is a function of the position of the movable object. The configuration of the receiver coil, discussed further below, may be such that a voltage is developed at the output of the receiver coil which is a function of the position of the coupler element.

In an example vehicular application, the coupler element is attached to, or otherwise mechanically coupled to a movable pedal arm or other vehicular control arm, so that its rotational position is a function of the position of the movable arm.

The coupler element may have an initial position, relative to the receiver coil, at which the receiver signal is a minimum. As the coupler element moves from the initial position, it modifies the inductive coupling between the transmitter coil and the first and second loop configurations. In examples of the present invention, in the initial configuration of the coupler element, the first and second signals are of similar magnitude and of opposite phase, so they tend to cancel each other out. As the coupler element moves, the inductive coupling between the transmitter coil and the first loop configuration increases, and at the same time the inductive coupling between the transmitter coil and the second loop configuration decreases. The receiver signal increases, as the difference in magnitudes between the first and second signals increases.

Receiver Coil

The term "receiver signal" can be used generally to refer to signals induced in the receiver coil, and also to any conditioned signal based on the signals induced in the receiver coil.

In examples discussed below, a single receiver signal is provided by the receiver coil that includes contributions from first and second signals formed in first and second loop configurations. The receiver coil may include a first loop configuration and a second loop configuration that provide first and second signals, respectively. The receiver signal is then some combination of the first and second signals.

For example, the first and second loop configurations may be configured to generate signal that are of opposite phase, the receiver signal being the combination of the first and second signals, and hence the receiver signal has a minimum value when the first and second signals have similar magnitudes. The receiver signal may also be termed a difference signal, as the magnitude of the receiver signal is a difference between a first signal amplitude induced in the first loop configuration, and a second signal amplitude induced in a second loop configuration.

In other examples of the present invention, the receiver coil may provide separate first and second signals from separate loop structures to an electronic circuit for processing.

The first and second loop configurations of the receiver coil can be configured to provide first and second voltages of opposite polarity for a given magnetic flux change through the receiver coil. The receiver coil can be configured so that the first and second signals tend to cancel each other in the absence of the coupler element. The coupler element also may have a zero position in which it blocks flux transmission to the first loop configuration and second loop configuration equally, so that the first signal and second signal effectively cancel each other out. As the coupler element moves in a first direction relative to the initial position, it blocks more magnetic flux inducing the second signal, while at the same time blocking less magnetic flux that induces the first signal. Hence, the magnitude of the first sigil increases, the magnitude of the second signal decreases, and the receiver signal increases in magnitude. The coupler element may also be moveable in a second direction, in which the magnitude of the second signal increases, and that of the first signal decreases.

Reference Coil

In further examples of the present invention, a reference coil, which may also be referred to as a differential dummy, is provided which provides a reference signal that is substantially independent of the position of the coupler element. However, the reference signal is susceptible to the same factors, which may be referred to generally as common mode factors, that influence the strength of the receiver signals. The common mode factors may include one or more of the following: coupler gap between the coupler element and the transmitter (or receiver) coil, variations in the excitation voltage applied to the transmitter coil, environmental electromagnetic fields inducing receiver noise, temperature variations, and the like.

An inductive sensor may be calibrated so that the sensor output takes a standard form independent of production variations in the form of the sensor. In an automotive system, the coupler gap between the coils (which may be supported on a printed circuit board) and the coupler element (which is linked to the accelerator pedal) strongly influences the induced signals in the receiver coil, and this coupler gap is difficult to precisely control in a mass production process. However, calibration processes can be a source of error and expense.

Conventional inductive sensors require extensive calibration curves for common mode factors such as temperature. For example, a conventional inductive sensor may include a temperature sensor, a look-up table of temperature correction factors, and circuitry to implement temperature correction. Using a ratio signal according to an example of the present invention, much of this additional complexity and associated unreliability can be avoided.

By determining a ratio signal as a ratio of the receiver signal and the reference signal, the effects of the common mode factors can be greatly suppressed, so that the ratio signal is substantially independent of the common mode factors, but correlated with the coupler position. The ratio signal can be determined by analog circuitry.

The reference coil may be similar in extent to the receiver coil, but can be configured in such a way that the reference voltage induced in the reference coil by the transmitter coil is substantially independent of the position of the coupler element. Examples are discussed further below, for example in relation to FIG. 8. The inductive coupling between the transmitter coil and the reference coil is affected by similar common mode factors as affect the inductive coupling between the transmitter coil and the receiver coil. These factors include a gap between the coupler element and a printed circuit board supporting the transmitter coil and the receiver coil, or the gap between the coupler element and the transmitter coil, or other structure supporting the transmitter coil.

Other common mode factors which may be compensated for using the reference coil include receiver signal variations resulting from variations in the alternating current power supply to the transmitter coil; variations resulting from induced voltages from stray electromagnetic signals unrelated to the sensor operation, temperature variations and the like.

In vehicular applications, the coupler element can be mechanically connected to a throttle pedal so that its rotational position is a function of the throttle pedal position.

Applications of examples of the present invention include configurations where the coupler element is attached to a movable part, the position of which is desired to be monitored, and the transmitter coil, receiver coil, and supporting circuitry are disposed on a substrate, such as a printed circuit board. The substrate is receivable by or otherwise secured proximate to a housing or other structure in which the movable part moves. For example, the movable part may be a pedal, and the pedal housing may be configured to receive a printed circuit board on which the coils are printed. Production assembly variations may lead to variations in the gap between the coupler element and the printed circuit board, and the use of the reference coil allows compensation for such manufacturing variations without need for extensive calibration processes.

The coil arrangements may take a wide number of forms. For example, the coils may be wound with different numbers of poles, which affects the position resolution of the sensor. The receiver coil is configured so that the position of the coupler element modulates the amplitude of the receiver signal. A reference coil, if used, can be configured such that the reference signal is substantially independent of the position of the coupler element, so that a ratio signal derived using the reference signal and the receiver signal is also correlated with the position of the coupler element, but substantially independent of factors such as temperature.

In one example, the transmitter coil, receiver coil, and the reference coil are printed on a printed circuit board, which may be a multi-layer printed circuit board. In other examples, the coils can be formed on separate structures.

FIG. 1 illustrates one form of the transmitter and receiver windings in plan view. An optional reference coil, such as that schematically illustrated in FIG. 4, can be formed in superposition to the transmitter and receiver coils on the same printed circuit board.

The transmitter coil 12 consists of one or more imprinted loops having a generally semicircular configuration, formed on a printed circuit board (PCB) 10. The oscillator 14, which may be formed on the same PCB, is connected to the transmitter coil and provides an alternating current (the excitation signal) to the transmitter coil, generating an alternating electromagnetic field, which subsequently induces signals in other proximate coils through inductive coupling.

The receiver coil 16 has an outer perimeter which is preferably within the area defined by the transmitter coil 12. In this example, the receiver coil includes first and second loop configurations, 16a and 16b, each of which represents an approximately 90 degree sector of a circular area. The two loops 16a and 16b are connected by a reversing connection 18, with no electrical connection between the crossing electrical conductors. This receiver coil is configured such that if a current flows in the receiver coil 16, the current would flow in reverse directions in the sections 16a and 16b. As illustrated in FIG. 1, when a clockwise current flows in section 16a, a counterclockwise current flows in section 16b.

Hence, the receiver coil includes a first loop, and a second loop, the loops being wound in opposed senses (i.e. clockwise and anticlockwise or vice versa), and the loops having a different spatial extent. In the example illustrated in FIG. 1, the first and second loops have non-overlapping spatial extents, though in other examples there may be some overlap.

By modifying the spatial distribution of the flux coupling between the transmitter coil and the receiver coil using a movable coupler element, the receiver signal varies in a manner correlated with the position of the coupler element.

In this example, the first loop provides a first signal, in this example a first voltage induced by inductive coupling with the transmitter coil, and the second loop provides a second signal, a second voltage induced by inductive coupling between the second loop and the transmitter coil. As the first and second loops have opposed sense of winding (i.e. clockwise and anticlockwise, or vice versa), the first voltage and second voltage are opposed.

If the inductive couplings between the transmitter and the two loops are similar, the induced voltages will tend to oppose each other, and the receiver signal will be a minimum, which may be zero.

FIG. 1 shows the two loop configurations arranged in an approximately semicircular arrangement. In a linear position sensor, such loop configurations may be arranged in a linear arrangement. Further, there may be any number of successive loop configurations.

Figure 2:
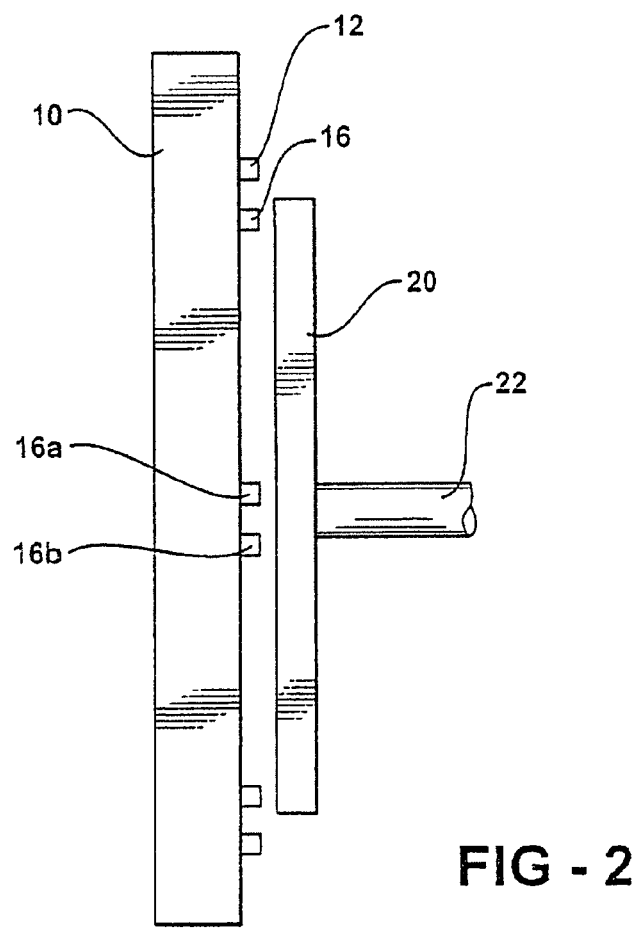
FIG. 2 is a side view of the printed circuit board, including the reference coil of the present invention and the associated coupler.

FIG. 2 shows a coupler element 20, formed of an electrically conductive material, supported substantially parallel to and proximate to the circuit board 10. In relation to FIG. 1, this figure is a top view, with the board shown as a horizontal cross-section. The coupler element reduces the inductive coupling between the transmitter coil and the receiver coil. The figure shows transmitter coil 10 and receiver coil 16. The coupler element may be, for example, a self-supporting metal sheet, or a metal film supported on a substrate, such as a one formed in a copper-coated circuit board.

Figure 3:
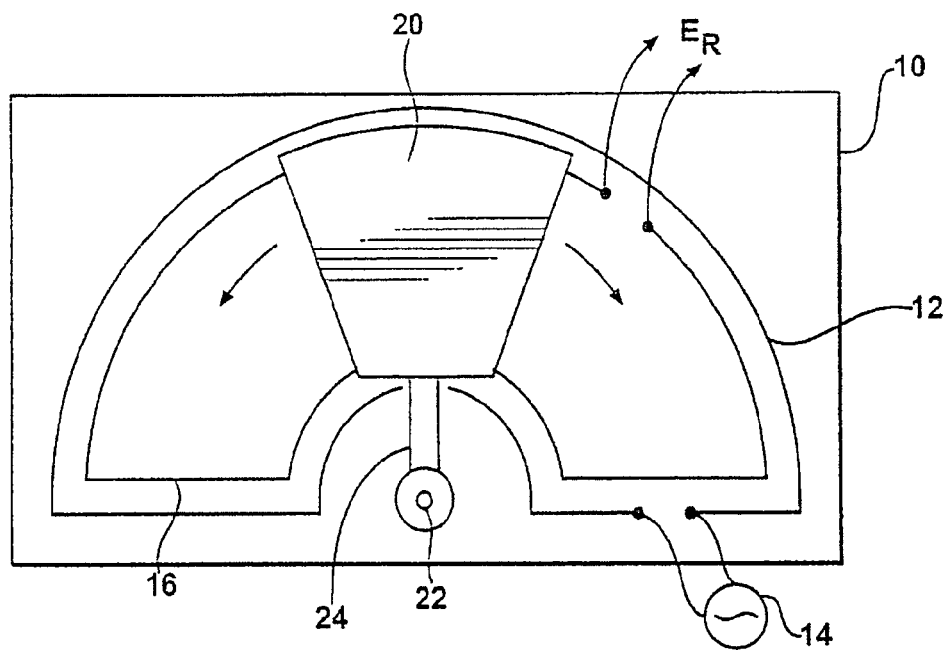
FIG. 3 is an illustration of a plan view of the exciter and receiver coils with the coupler in position.

FIG. 3 shows the coupler element 20 in plan view, overlying the circuit board 10 with the transmitter coil 12 connected to the oscillator 14, and receiver coil 16. The coupler element 20 is rotated around the shaft 22 by connecting member 24 in a plane substantially parallel to the plane of the transmitter and receiver coils.

If the coupler element is centered, relative to the two loops, it will approximately block flux coupling between the transmitter coil and the two loops to an equal degree. Hence, the voltages induced in each loop will be approximately the same, but opposed (equivalently, out of phase for induced alternating voltages), hence the receiver signal will be a minimum. However, as the coupler element rotates around the shaft 22, for example rotating clockwise, it will block flux coupling between the transmitter coil and the second loop (on the right in FIG. 1) to a greater degree, and will block flux coupling between the transmitter coil and the first loop (on the left in FIG. 1) to a lesser degree. Hence, the magnitude of the induced voltage in the first loop will become significantly greater than the induced voltage in the second loop, and the receiver signal will increase.

Another feature of this configuration is that it is sensitive to the direction of rotation of the coupler element, for example if the phase of the receiver signal is determined. Associated circuitry may convert alternating voltages of opposed phases to opposed sign direct voltages, for example, relative to a defined ground voltage.

For example, the coupler element 20 can be in the form of a substantially 90 degree circular sector so that it is capable of covering one of the receiver loops 16a or 16b at any one time or substantially half of the transmitter loop 12

FIG. 3 may correspond to an application where the coupler element 20 is driven by the pivot able pedal arm of an automotive throttle pedal, so that the angular (or rotational) position of the coupler element 20 is a function of the pedal position. In such an application, the receiver signal is correlated with the pedal position, and can be used to control an engine speed.

Figure 4:
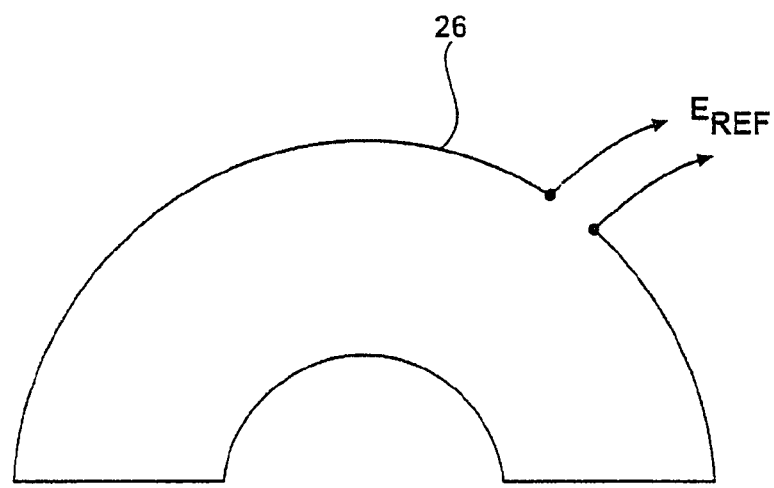
FIG. 4 is an illustration of the reference coil employed in connection with the present invention which is overlaid on the circuit boards of FIGS. 1-3, but is shown separately for purposes of clarity.

FIG. 4 illustrates a reference coil that can be superimposed on the circuit board 10 along with the coils 12 and 16, in a symmetrical relationship. The reference coil may be supported by the same circuit board as the other coils, possibly within a multi-layer circuit board.

The reference coil 26 has a similar configuration to the receiver coil 16, but it only employs a single loop. Thus, the angular (rotational) position of the coupler element 20 does not affect the current induced into the reference coil 26. The coupler 20 essentially covers half of the reference, independent of the rotational position of the reference (within a certain angular range), and the magnitude of the current induced into the coil 26 is substantially the same independent of the rotated position of the coupler 20. However, common mode signals such as electromagnetic interference, variations in exciter voltage, variations produced by temperature changes, and variations in the gap position between the coupler element 20 and the printed circuit board 10, will affect the voltage induced in the reference coil 26 in the same way that they affect the voltage induced in the receiver coil 14.

Figure 5:
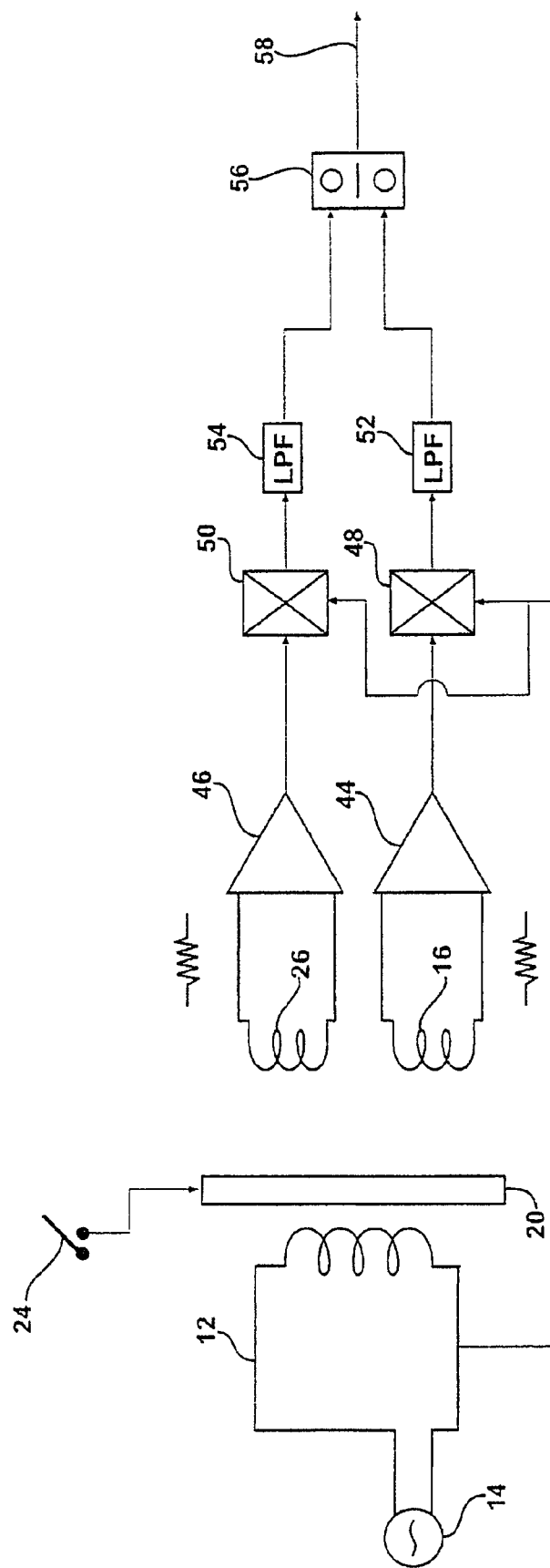
FIG. 5 is a schematic diagram of a system for generating an output control signal having a value representative of the throttle pedal position in an automotive vehicle, employing the sensor of the present invention.

FIG. 5 is a simplified schematic of an electronic circuit which may incorporate an inductive sensor according to an example of the present invention. An electronic circuit is provided for processing the sensor output signals in order to derive, for example, a control signal for a vehicle engine.

The oscillatory alternating current source 14 coupled to the exciter coil 12. The coupler 20 is illustrated here for convenience as disposed between the exciter coil 12 and the receiver coil 16 and the reference coil 26. The outputs of the receiver coil 16 and the reference coil 26 are passed through amplifiers 44 and 46 and provided to a pair of multipliers 48 and 50, respectively. The multipliers 48 and 50 also receive the oscillator signal 14 as their second input and they act as demodulators. The outputs of the demodulating multipliers 48 and 50 are provided to a pair of low pass filters 52 and 54, respectively. The outputs of the low pass filters are passed to a divider 56.

The low pass filters extract the constant reference coil signal and the signal from the filter 52 which is essentially a function of the position of the coupler 24. Dividing the coupler dependent signal by the reference coil signal, achieved by the divider 56, essentially removes common mode variations such as signal level variations due to variations in the gap between the coupler element and the printed circuit board, variations in the exciter voltage, electronic noise and the like.

The output of the divider 56 constitutes a control signal 58. In an automotive application, this may be used to control the speed of the engine. Other circuitry might be added to adjust the gain of the signal to zero it at a predetermined point and to adjust upper and lower clamping levels on the output signal.

In FIG. 1, the transmitter coil was shown as comprising a single turn. However, multiple turns may be used. Similarly, the first and second loop configurations of the receiver coil may include multiple turns.

In an exemplary automotive application, a throttle pedal is mechanically joined to a coupler element so that the pedal position controls the position of the coupler element. For example, the coupler element may be rotated in the plane of a circuit board housing the electronic circuit and supporting transmitter and receiver coils.

Figure 6:
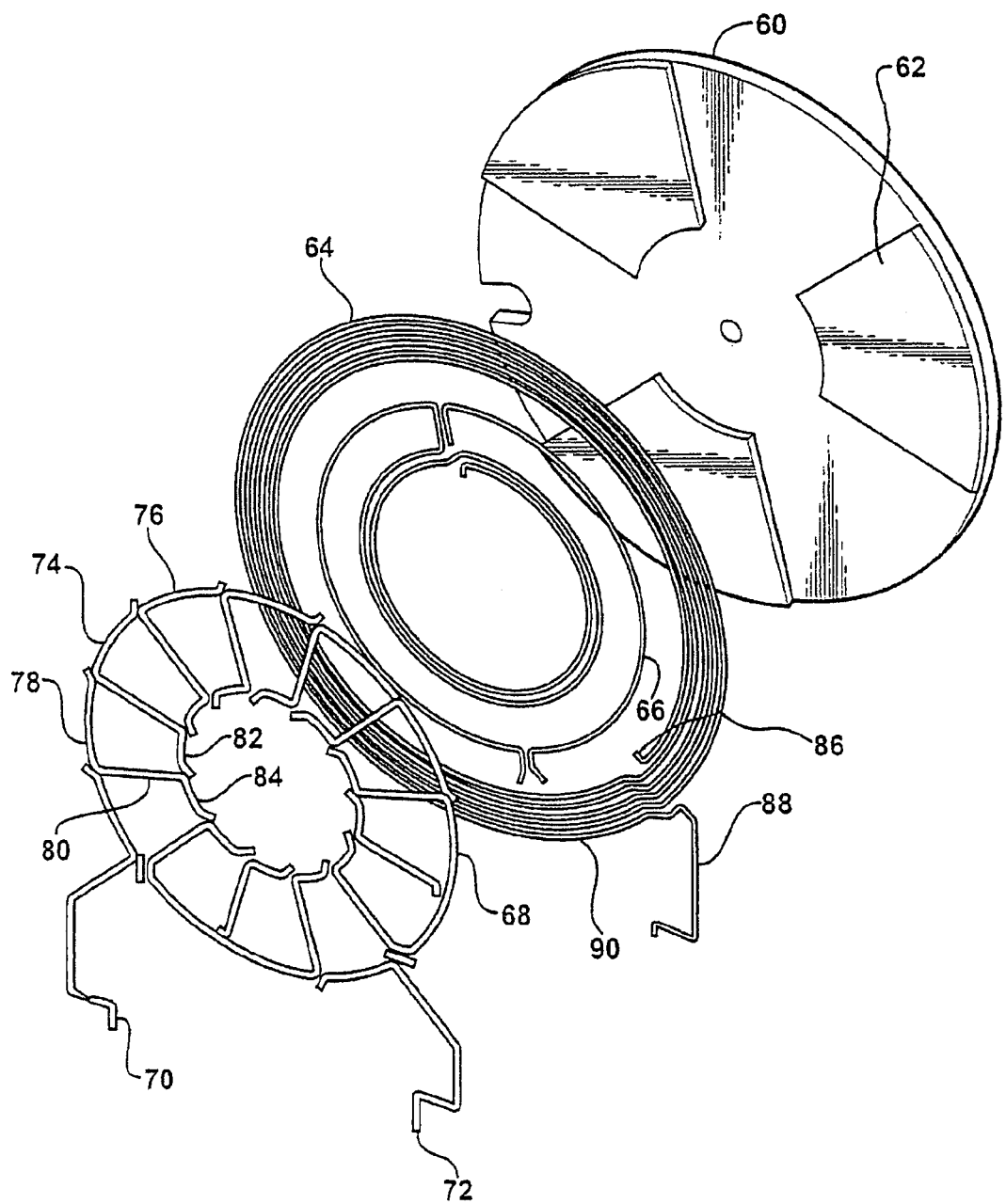
FIG. 6 shows an inductive sensor according to an example of the present invention.

FIG. 6 illustrates a further example of an inductive sensor, including a rotating disk 60 having a plurality of electrically conducting patches, such as coupler element 62. The inductive sensor further includes transmitter coil 64, reference coil 66, and receiver coil 68. The reference coil is more clearly shown in FIG. 8.

The transmitter coil is excited by an alternating current source connected to the transmitter coil ends 86 and 88. The excited transmitter coil generates an electromagnetic field, which induces signals in the reference coil 66 and receiver coil 68 by inductive coupling. The inductive coupling between the transmitter coil and both the reference coil and the signal coil is modified (reduced) by the coupler elements such as coupler element 62. However, the inductive coupling between the transmitter coil and the reference coil is not sensitive to the angular position of the rotating coupler. In contrast, the receiver signal is sensitive to the angular position of the rotating disk 60, so that a ratio of the receiver signal and the reference signal is correlated with the angular position of the rotating coupler while also being corrected for common mode factors as discussed above, such as the gal) between the transmitter coil and the rotating disk. The receiver signal is obtained between receiver coil ends 70 and 72.

The outer periphery of the receiver coil comprises sequential segments, such as 78, 74, and 76, in which sequential segments alternate as being part of a first loop configuration or a second loop configuration. For example, outer segment 74 is part of the same loop configuration as inner segment 82, connected by a radial spoke 80, both part of a first loop configuration, whereas outer segments 76, 78, and inner segment 84 are pail of a second loop configuration. As illustrated, a radial spoke such as 80, part of the second loop configuration, conceals a second radial spoke behind it, the concealed spoke being part of the first loop configuration. The two loop configurations are interconnected by a reversing connection so that a first signal in the first loop configuration, and a second signal in the second loop configuration, oppose each other, and may cancel out if the inductive coupling to each of the two loops is the same. The cancellation may occur, for example, if the rotating coupler is removed. In position sensor applications, if the rotating coupler element can move to a position where the inductive coupling to one loop configuration is reduced, and the inductive coupling to the other loop configuration is increased, changing the receiver signal in a manner correlated with coupler element position.

In this example, the first loop configuration comprises a number of radially extending lobes, formed by an inner segment, a radial spoke, an outer segment, a radial spoke, an inner segment, and so on. The radial lobes of the first and second loop configurations alternate within the receiver coil shown in FIG. 6. Also, as shown in the example FIG. 6, the coupler element is a segment having an angular width twice the angular width of a radial lobe of the first or second loop configurations. As shown, the receiver coil substantially entirely formed of radial conductors, or elements orthogonal to a radial direction.

Figure 7:
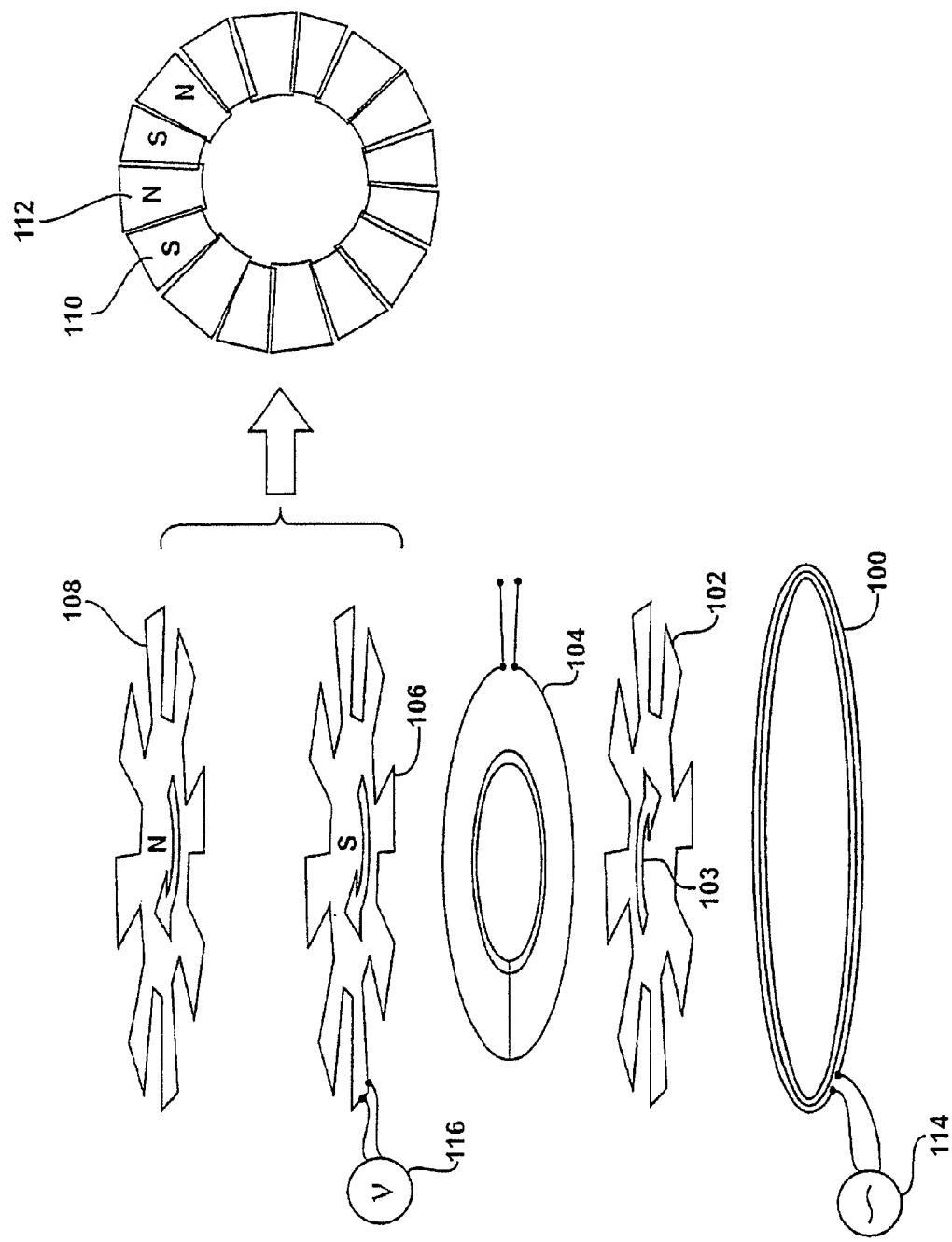
FIG. 7 is a schematic of an inductive sensor.

FIG. 7 is a simplified schematic of an inductive sensor according to another example of the present invention. The sensor comprises a receiver coil (discussed below), reference coil 104, a rotating coupler 103 having electrically conducting coupler elements such as 102, and a transmitter coil 100.

The receiver coil includes first and second loop configurations at 106 and 108 respectively. These loop configurations are separated for illustrative convenience. However, a receiver coil could contain such separated loop configurations, if desired. The receiver coil, illustrated to the right, effectively contains lobes such as 110 and 112, with alternating labels S and N. This nomenclature indicates the first and second loop configurations, which are interconnected so that an anticlockwise current passed through one lobe would flow as a clockwise current an adjacent lobe, and inducing alternating directions of magnetic field in successive radially extending lobes. In other words, a crossed connection can be used to create opposing induced voltages in the receiver coil when the two loop configurations are exposed to electromagnetic field from an excited transmitter coil.

Rotation of the rotating coupler 102 about axis 103 modifies inductive coupling between the transmitter coil 100 and the two loop configurations of the receiving coil, but does not influence significantly the inductive coupling between the transmitter coil and the reference coil 104.

Figure 8:
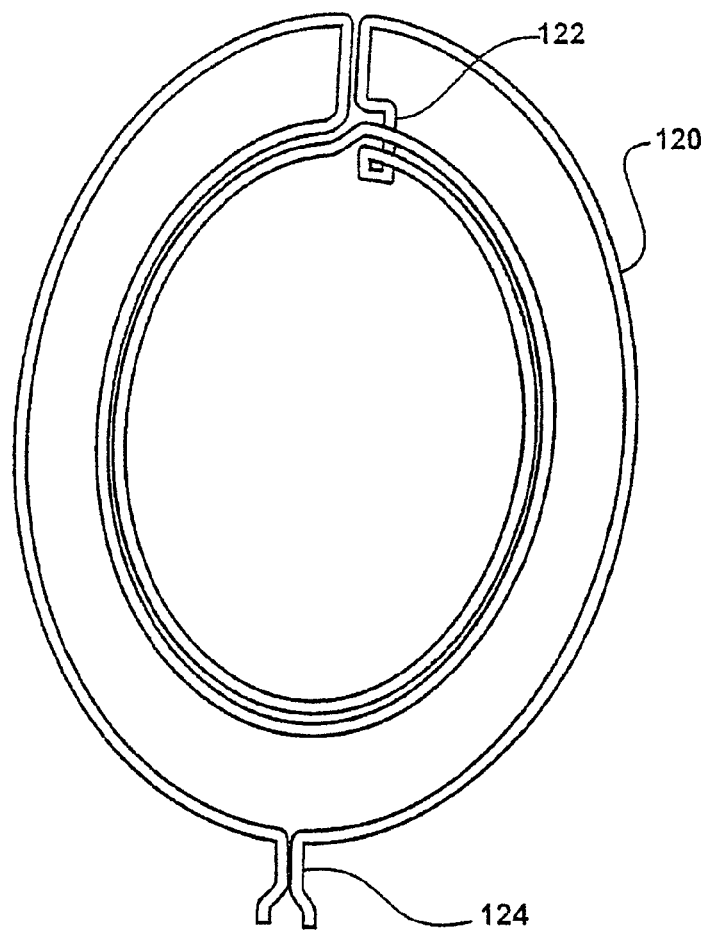
FIG. 8 shows a design for a reference coil.

FIG. 8 shows an example reference coil structure, having an outer turn 120 and two inner turns. The use of a reference coil to substantially eliminate the effect of common mode factors was discussed in more detail elsewhere. The two inner turns are connected to the outer turn through jogged connection 122, which avoids electrical contact between the electrical conductors. The reference signal is an induced voltage obtained at 124.

Figure 9:
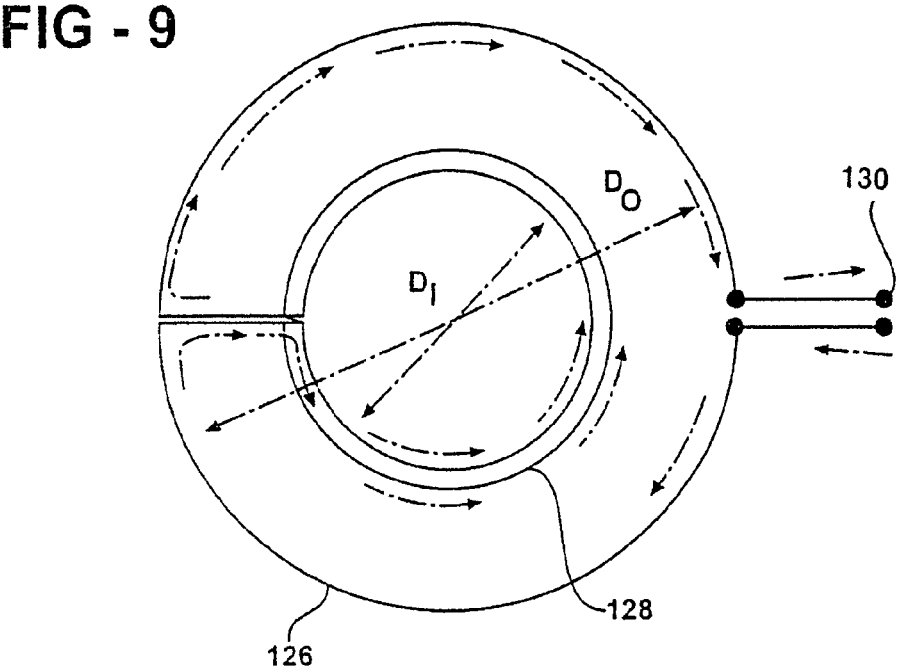
FIG. 9 is a schematic of a reference coil.

FIG. 9 further illustrates current flow through the single turn of the outer loop 126 and the two turns of the inner loop 128. The reference signal will be a reference voltage output at 130 will be the sum of the opposed induced voltages within the inner loop and the outer loop.

If the reference coil was connected to a current source, the current direction along the inner and outer turns would in opposite senses, for example a clockwise direction along the outer turns and counterclockwise along the inner turns, as illustrated by arrows in FIG. 9.

In this example, the reference coil has an outer diameter $D_o$ and an inner diameter $D_i$. The general topology of the reference coil can be such that the output is zero when the coupler is removed, which can be achieved by configuring the reference coil using the following relationship: $n_i D_i^2 = n_o D_o^2$, where $n_i$ is the number of inner turns, and $n_o$ is the number of outer turns. In the examples of FIGS. 8 and 9, the reference coil has one outer turn and two inner turns.

Example reference coils were designed for electronic throttle control applications. In one example, a reference coil had an inner diameter (2 turns) of 17.7 mm and an outer diameter (1 turn of 25 mm). In another example, a reference coil had an inner diameter (3 turns) of 14.4 mm, and an outer diameter (1 turn) of 25 mm.

The reference signal can be thought of as the sum of a current that would be generated by one coil comprising the inner turn(s) and the opposed current that would be generated by a second coil comprising the outer turn(s). The coupler element blocks part of the inductive coupling to the second coil, the outer turns, leading to a resultant signal. However, the resultant signal is substantially independent of the position of the coupler element.

The reference coil can be designed so that induced signals in the radial parts of the coil configuration cancel.

Figure 10A:
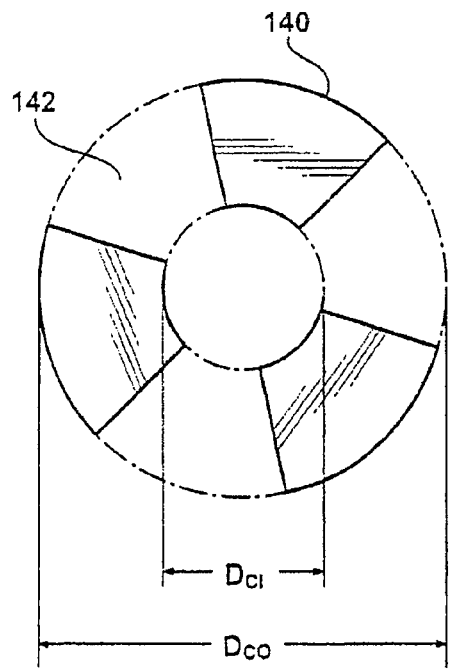
FIG. 10A shows a schematic of a coupler element.

FIG. 10A illustrates a coupler element 140, which may for example be supported on a rotating disk 142. The coupler elements have an inner periphery, a circular arc having an inner coupler diameter $D_{CI}$, which corresponds to twice the radius of the arc as measured from the axis of rotation, and an outer periphery having an outer coupler diameter $D_{CO}$.

Figure 10B:
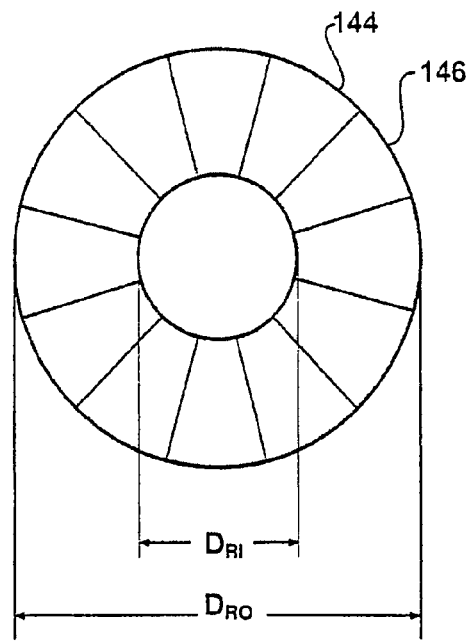
FIG. 10B shows a simplified schematic of a receiver coil.

FIG. 10B illustrates a simplified schematic of a receiver coil. The coupler element 140 subtends a pair of adjacent lobes of the receiver coil. In this simplified schematic, a tap in the receiver coil to obtain the receiver voltage is not shown. Alternate outer segments 144 and 146 correspond to parts of first and second loop structures respectively, in which a current flowing through the receiver coil moves in opposite senses (clockwise and anticlockwise). If a uniform current flows through the coil, the current direction alternates between adjacent outer segments and also between adjacent inner segments. The radial spokes corresponding to a conductor from the first loop carrying current from an inner segment to an outer segment, and a conductor from the second loop carrying current in an opposed direction. The receiver coil has an inner receiver diameter and an outer receiver diameter, $D_{RI}$ and $D_{RI}$, respectively.

An inductive sensor according to an example the present invention comprises the coupler elements of FIG. 10A, the receiver coil of FIG. 10B, and a transmitter coil having multiple circular turns of exciter diameter $D_E$. In examples of the present invention, the inner coupler diameter is approximately equal to the inner receiver diameter, the outer coupler diameter is approximately equal to the exciter diameter, and the exciter diameter is greater to (or may be approximately equal to) than the outer receiver diameter. The coupler, receiver coil, and transmitter coil have a common central axis.

FIG. 10B illustrates a receiver coil having concentric inner and outer peripheries, each periphery comprising curved conducting segments, alternate segments carrying current in opposite directions. A receiver coil may comprise a concentric assembly of a number of such structures, the outer diameter of a smaller structure being approximately equal to the inner diameter of the next large structure. In other examples, the radial spokes shown in 10B may be resistive elements.

Figure 11:
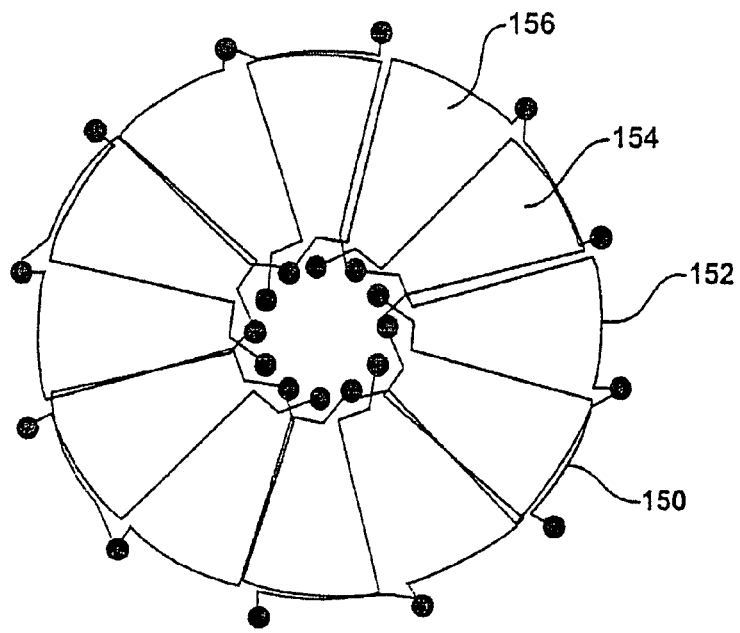
FIG. 11 shows a further schematic of a receiver coil.

FIG. 11 shows another illustration of a receiver coil, with successive outer conducting segments 150 and 152 carrying current in opposed directions. Successive lobes 154 and 156 would generate opposed magnetic fields if a current were passed through the coil.

In other applications of the invention, other mechanical elements could be used to drive the coupler. The coupler motion can be linear, rotational, or some combination of rotation and linear motion in one or more directions.

The coupler element can be an intrinsic part of a movable part whose position is to be measured, or can be attached to the movable part, or otherwise mechanically coupled so that the coupler element position is correlated with the movable part position.

Bipolar Transmitter Coil

Figure 12:
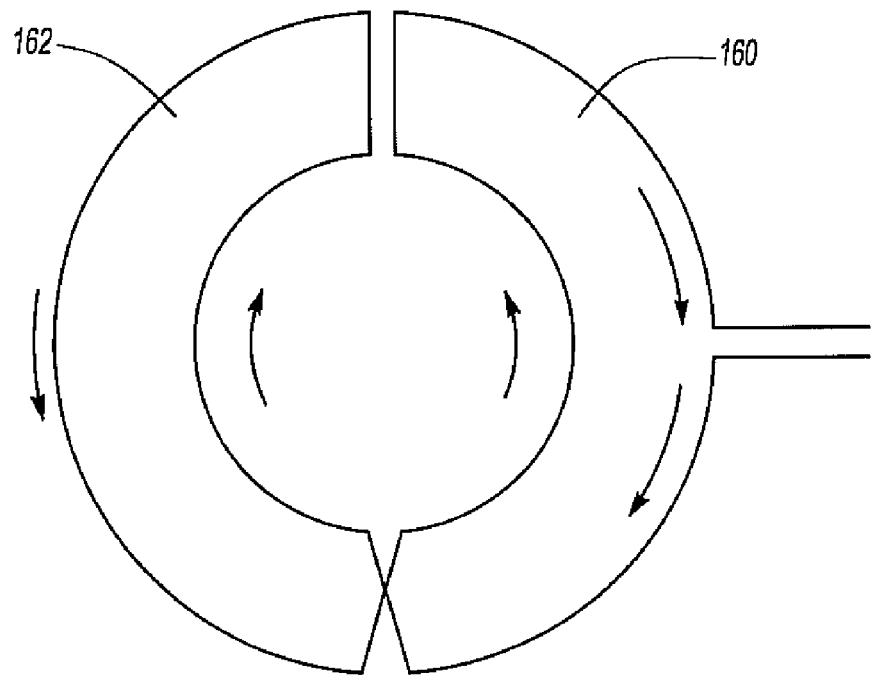
FIG. 12 illustrates a bipolar transmitter coil, which may be used in examples of the present invention.

In other examples of the present invention, the transmitter coil may be configured as shown in FIG. 12. The arrows indicated a direction of current for one cycle of the alternating current excitation. The transmitter coil has a configuration which may be termed bipolar, having a first loop 160 and second loop 162, the interior regions of which are surrounded by clockwise and anticlockwise currents respectively. Hence, the two transmitter coil loops generate magnetic fields having opposed directions of magnetic flux. This configuration can be described as having two lobes, each approximately 180 degrees. However, a greater number of lobes, such as 4, 6, 8 or other number, can be used, so that the transmitter coil generates opposite magnetic flux from different spatial regions.

Using a transmitter coil as shown in FIG. 12, the induced voltage in a receiver coil, which in this example may be one or more circular turns, can be configured to be zero in the absence of a coupler element, due to the opposing effects of flux coupling from the two opposed magnetic fields. However, a coupler element can be used to selectively block magnetic flux from the first or second loop, leading to a receiver signal that is correlated with coupler position. As with other examples discussed above, the coupler element modifies the spatial distribution of flux coupling between the transmitter coil and the receiver coil, leading to a receiver signal correlated with the position of the coupler element.

A transmitter coil may generate electromagnetic flux having, at a particular time, a spatial distribution of magnetic field direction, and a coupler element used to modify the spatial distribution so that the receiver signal is correlated with coupler position. The total flux coupling, as an integrated magnitude, need not change as the coupler element moves.

Other Coupler Element Configurations

The coupler element blocks inductive coupling between the transmitter coil and the receiver coil by virtue of eddy currents generated in the coupler element, which effectively shield the receiver coil from that flux. The coupler element need not be plate-like.

Figure 13:
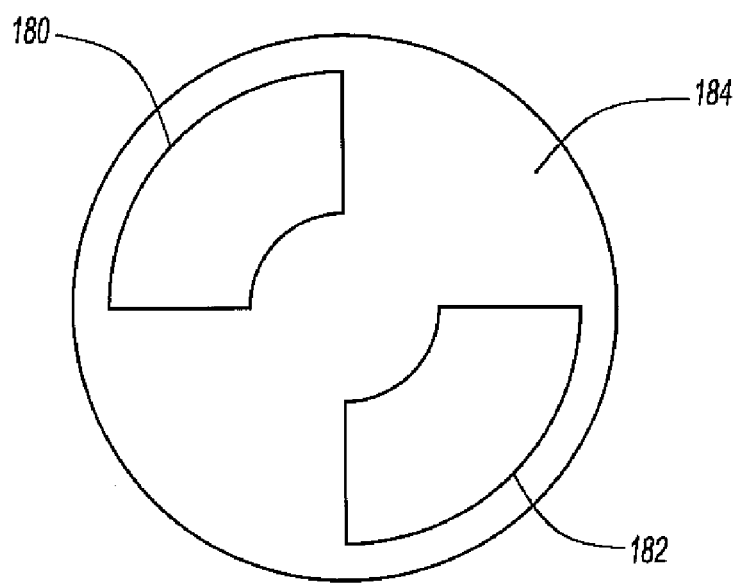
FIG. 13 illustrates a conducting loop used as a coupler element.

FIG. 13 illustrates another possible example of a coupler element. Disk 184, which may rotate as a movable part such as a pedal is moved, has two coupler elements disposed thereon, in the form of first coupler loop 180 and second coupler loop 182. Eddy currents can be generated in these loops by magnetic flux generated by the transmitter coil, and these eddy currents effectively shield the receiver coil from flux in a similar manner to a similarly sized conducting plate. Hence, a coupler element may be in the form of a conducting plate, a conducting loop, or other structure such as a plate having holes drilled therein, for example to reduce weight or to allow fluid to pass through the coupler element, or a plate generally having one or more apertures but having at least a conducting peripheral loop.

In examples where the transmitter coil is a circular loop, for example as shown in FIG. 6, and the coupler element rotates around an axis, the coupler element may be configured to have a periphery comprising an inner circular arc, and outer circular arc, the inner and outer circular arcs being connected by radial sides. In this context, radii and circular arcs refer to a geometry centered on the central axis. The coupler element periphery may be the outer edge of a plate or the course of an electrical conducting loop, for example.

Signal Conditioning

Signal conditioning apparatus and methods are also described in our U.S. Prov. App. Ser. No. 60/669,478, filed Apr. 8, 2005.

In examples of the present invention, the receiver signal is effectively modulated by the coupler element position, whereas the reference signal is substantially independent of the coupler element position. Amplification of the receiver signal, followed by multiplication of the receiver signal and the excitation signal (provided to the transmitter coil), followed by a low pass filtering, can be used to give a receiver signal that is a dc voltage correlated with the position of the coupler element. Similarly, a reference signal may also be amplified, multiplied by the exciter signal, and low pass filtered to provide a reference signal that is a dc voltage which varies with common mode factors that also affect the receiver signal. Then, division of the receiver signal by the reference signal gives a ratio signal, also correlated with the position of the coupler element, but substantially independent of common mode factors. In examples of the present invention, the multiplication and division steps described in this paragraph are carried out by analog circuitry.

The output of an analog divider, such as described above, and also corresponding to 58 in FIG. 6, can then be further amplified. The output voltage ranges can be clamped to upper and lower plateau values, and an amplifier gain adjusted to obtain a desired slope (angular position versus output voltage). Trim resistors can be used to adjust the gain slope to a desired value. For example, laser trimming of resistors can be used, burning off carbon strips to obtain a desired trim resistance, or traditional moving wiper variable resistors may also be used in some applications. In an automotive electronic throttle control application, this trim adjustment can be carried out once during factory calibration. The use of radiometric sensing (use of a reference coil) significantly reduces the need for later calibration adjustment.

In examples of the present invention, the entire signal conditioning may be performed by analog circuitry. A digital signal processor is not required. In other examples, the ratio signal may be formed by analog division, but a digital circuit used to adjust the signal output to desired upper and lower plateau values.

The output voltage may not be entirely linearly dependent on position. A useable range of linearity may be defined, extrapolating to a virtual ground, which may be a negative voltage relative to the true ground. The ratio signal may be formed as the ratio of (receiver signal+A)/(reference signal+B), where the reference signal and receiver signal refer to DC voltages obtained by, e.g. demodulating and low-pass filtering of the receiver and reference signals, respectively. A and B are virtual ground corrections, due to assumed linearity over a range of slightly non-linear response. The width of the useable linear range may be determined by positional accuracy specifications. The correction terms A and B are likely to be very similar, and in some examples the same value of virtual ground correction can be used for both A and B.

Further calibration steps can be used to adjust the lower and upper plateau voltages. The following discussion relates to an automotive example. An idle plateau length can be used (a constant lower plateau voltage for some small depression of the gas pedal). A constant voltage can be added to the output voltage to obtain a desired slope position, and this also adjusts the idle plateau length. The idle position can be adjusted (lower plateau voltage), for example using a virtual ground adjustment. For example, the virtual ground may be approximately 2.5 V in relation to the chassis ground, for an approximately 0-5 V voltage output range. Calibration can be achieved using switchable resistors within an ASIC on the circuit board, and need only be done once during factory construction of the sensor.

Examples of the present invention need no memory, for example, to store temperature calibration data if this common mode factor is compensated for using a reference coil (or differential dummy) output.

Inductive sensors according to the present invention include non-contacting inductive sensors used in automotive applications, including sensors employing a transmitter winding excited with an alternating current, a receiver winding, a rotatable coupler connected to the throttle pedal and positioned in relation to the windings for varying the amplitude of the transmitter signal induced in the receiving coil, and a third coil which receives a signal similar to the receiver signal, the signal being substantially independent of the coupler rotation position, for use in compensating the received signal for variations in the gap between the coupler and the coils as well as other common mode signals.

Other applications of inductive position sensors according to examples of the present invention include electronic suspension controls, load weight detection in vehicles, electronic brake controls, electronic clutch controls, hand-operated throttle controls, accelerometers in one or more dimensions (for example, by detecting relative inertial movements of objects due to acceleration), electronic steeling controls (e.g. steering wheel rotation, adjustable telescoping position if appropriate, and wheel angle), tire pressure sensors (for example, detecting a displacement due to pressure), yaw, pitch, and roll controls, seat position detection, and rotation speeds (in some examples of the present invention). Engine speed (throttle) controls according to examples of the present invention include boat engine speed controls, airplane engine speed controls, hand-operated controls for any kind of vehicle, and the like.

Examples of the present invention can be fabricated on small distance scales, such as microscopic scales, for example as MEMs structures, and can be used in microelectronic systems, microfluidic controls, computer memory drive controls, and the like.

In other examples of the present invention, the coupler element may comprise a conducting fluid, flowing material, or other variable configuration material. Examples of the present invention may be used to determine a distribution of a conducting material, such as an extent of conducting material, proximate to the transmitter and receiver coils.

In other examples, a reference coil and receiver coil may be integrated into a single structure. Switching may be provided to switch a receiver coil configuration into a reference coil and back again. Certain sensor applications may require redundancy of sensor elements. Hence, a sensor may include two or more transmitter coils, receiver coils, and reference coils.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, our U.S. Prov. Pat. Apps. Ser. Nos. 60/561,065 filed Apr. 9, 2004; 60/561,007 filed Apr. 9, 2004; 60/598,192, filed Aug. 2, 2004, 60/669,145, filed Apr. 7, 2005, and 60/669,478, filed Apr. 8, 2005, are incorporated herein in their entirety.

The invention claimed is:

1. An apparatus for determining a part position of a movable part, comprising:
    a transmitter coil, the transmitter coil generating electromagnetic radiation when the transmitter coil is excited by a source of electrical energy;
    a receiver coil disposed in proximity to the transmitter coil, the receiver coil generating a receiver signal when the transmitter coil is excited due to an inductive coupling between the receiver coil and the transmitter coil; and
    a coupler element overlying at least a portion of said transmitter coil and at least a portion of said receiver coil, the coupler element being moveable and having a coupler element position correlated with the part position,
    the coupler element modifying the inductive coupling between the transmitter coil and the receiver coil so that the receiver signal is correlated with the part position, wherein the receiver coil includes a first loop configuration and a second loop configuration, the first loop configuration and second loop configuration having opposite winding directions, and wherein the inductive coupling between the transmitter coil and the first loop configuration generates a first signal, the inductive coupling between the transmitter coil and the second loop configuration generates a second signal, the receiver signal being a combination of the first signal and the second signal.

2. The apparatus of claim 1, wherein the coupler element comprises a metal plate.

3. The apparatus of claim 1, wherein the transmitter coil includes a first loop configuration and a second loop configuration, the first loop configuration and second loop configuration having opposite winding directions.

4. The apparatus of claim 1, wherein the receiver signal has a receiver signal magnitude that is a difference between a magnitude of the first signal and a magnitude of the second signal.

5. The apparatus of claim 1, the first and second signals being of opposite phase, the receiver signal being the sum of the first signal and the second signal.

6. The apparatus of claim 1, wherein the coupler element position is an angular position of the coupler element, a rotation of the coupler element modifying the inductive coupling between the transmitter coil and the receiver coil.

7. The apparatus of claim 5, wherein the receiver coil includes a first loop configuration and a second loop configuration, the inductive coupling generating a first voltage in the first loop configuration and a second voltage in the second loop configuration, wherein rotation of the coupler element modifies the ratio of the first voltage to the second voltage.

8. The apparatus of claim 7, wherein the first loop configuration and second loop configuration both radially extending lobes.

9. The apparatus of claim 6, wherein the part position is a position of a pedal, movement of the pedal being mechanically coupled to the angular position of the coupler element.

10. The apparatus of claim 1, further comprising a reference coil, the reference coil generating a reference signal when the transmitter coil is excited due to a second inductive coupling between the transmitter coil and the reference coil, the second inductive coupling being substantially independent of the coupler element position.

11. The apparatus of claim 10, further comprising electronic circuitry operable to form a ratio signal, the ratio signal being a ratio of the reference signal and the receiver signal, the ratio signal being used to determine the part position.

12. An apparatus for determining a part position of a movable part, comprising:
    a transmitter coil, the transmitter coil generating electromagnetic radiation when the transmitter coil is excited by a source of electrical energy;
    a receiver coil disposed in proximity to the transmitter coil, the receiver coil generating a receiver signal when the transmitter coil is excited due to an inductive coupling between the receiver coil and the transmitter coil;
    a coupler element overlying at least a portion of said transmitter coil and at least a portion of said receiver coil, the coupler element being moveable and having a coupler element position correlated with the part position,
    the coupler element modifying the inductive coupling between the transmitter coil and the receiver coil so that the receiver signal is correlated with the part position;
    a reference coil, the reference coil generating a reference signal when the transmitter coil is excited due to a second inductive coupling between the transmitter coil and the reference coil, the second inductive coupling being substantially independent of the coupler element position.

13. The apparatus of claim 12, further comprising electronic circuitry operable to form a ratio signal, the ratio signal being a ratio of the reference signal and the receiver signal, the ratio signal being used to determine the part position.

14. An apparatus for determining a part position of a movable part, comprising:

a transmitter coil, the transmitter coil generating electromagnetic radiation when the transmitter coil is excited by a source of electrical energy;

a receiver coil disposed in proximity to the transmitter coil, the receiver coil generating a receiver signal when the transmitter coil is excited due to an inductive coupling between the receiver coil and the transmitter coil; and a coupler element having two sides and overlying at least a portion of said transmitter coil and at least a portion of said receiver coil, said at least a portion of said transmitter coil and said at least a portion of said receiver coil being positioned on the same side of said coupler element, the coupler element being moveable and having a coupler element position correlated with the part position, the coupler element modifying the inductive coupling between the transmitter coil and the receiver coil so That the receiver signal is correlated with the part position;

a reference coil, the reference coil generating a reference signal when the transmitter coil is excited due to a second inductive coupling between the transmitter coil and the reference coil, the second inductive coupling being substantially independent of the coupler element position.

15. The apparatus of claim 14, wherein the receiver coil includes a first loop configuration and a second loop configuration, The fast loop configuration and second loop configuration having opposite winding directions.

16. The apparatus of claim 14, wherein the transmitter coil includes a first loop configuration and a second loop configuration, the first loop configuration and second loop configuration having opposite winding directions.

17. The apparatus of claim 15, wherein the inductive coupling between the transmitter coil and the first loop configuration generates a first signal, the inductive coupling between the transmitter coil and the second loop configuration generates a second signal, the receiver signal being a combination of the first signal and the second signal.

18. The apparatus of claim 14, wherein the coupler element position is an angular position of the coupler element, a rotation of the coupler element modifying the inductive coupling between the transmitter coil and the receiver coil.

* * * * *